Feb. 6, 1973  F. J. SALZANO ET AL  3,715,296
ELECTROCHEMICAL CARBON ACTIVITY METER
Filed May 6, 1970

INVENTORS.
FRANCIS J. SALZANO
MICHAEL R. HOBDELL
BERTRAM MINUSHKIN
WALTER KALINOWSKI
LEONARD NEWMAN

United States Patent Office 3,715,296
Patented Feb. 6, 1973

3,715,296
ELECTROCHEMICAL CARBON ACTIVITY METER
Francis J. Salzano, Patchogue, N.Y., Michael R. Hobdell, Gloucestershire, England, and Bertram Minushkin, Smithtown, Walter Kalinowski, Brookhaven, and Leonard Newman, Smithtown, N.Y., assignors to the United States of America as represented by the United States Atomic Energy Commission
Filed May 6, 1970, Ser. No. 35,099
Int. Cl. G01n 27/30
U.S. Cl. 204—195 R                              4 Claims

ABSTRACT OF THE DISCLOSURE

An electrochemical cell for measuring the chemical activity and concentration of carbon present in a sodium system. The cell consists of an electrode immersed in an electrolyte of $Na_2CO_3$ and $Li_2CO_3$ contained within a thin iron wall cup which is placed within the sodium. The amount of voltage generated is related to the carbon content of the sodium and the ability of sodium to carburize or decarburize various steels.

BACKGROUND OF THE INVENTION

The invention described herein was made in the course of, or under a contract with the United States Atomic Energy Commission.

Current designs for fast breeder reactors call for the use of sodium as a coolant in systems which will contain austenitic and ferritic alloy steels. It is well known that carbon is transported via sodium from ferritic to austenitic steels and that carbon migrates through sodium from hotter to the colder regions in an all-austenitic or all-ferritic steel system. The addition or removal of carbon from these alloys can cause significant and in some cases serious deterioration in mechanical properties. The problem is further complicated by the uncertainty in the solubility of carbon in sodium, lack of knowledge about the thermodynamic activity of carbon in sodium-steel systems, and only limited information on the kinetics and mechanism of carbon transport in sodium. Furthermore, the relation between carbon and other impurities known to exist in sodium is not thoroughly understood, the relationship between carbon and oxygen being of special interest because of the role of oxygen in the corrosion of stainless steel.

Efforts have been made in recent years to develop in-line apparatus for monitoring continuously for the detection of carbon contamination or evidence of carbon transport which could, if left to continue, cause permanent damage to, or at least reduce the effectiveness of, and result in unsafe conditions of the reactor facilities. One such device which has come under recent development is a system in which a decarburizing gas is pumped through a probe immersed in the sodium. The probe contains a carbon permeable membrane through which carbon diffuses. The gas removes the carbon and subsequent analysis of the gas for CO in a gas analyzer gives a reading indicative of or related to the carbon content of the sodium into which the probe is immersed.

While the apparatus described above for indicating carbon activity is useful there are several factors which limit its usefulness severely. The device is not an absolute activity or concentration meter so that expensive calibration must be undertaken before each application and there is always some uncertainty attached to its results. The system requires operating temperatures of about 750° C. which is somewhat higher than most sodium systems of interest, which is about 650° C. Also, there is a tendency to eject large quantities of $H_2$ into the sodium through the probe wall which conceivably could present new problems over a period of time. Furthermore, it is not known if this system distinguishes between carbon available for carburization and stable forms of the carbon.

SUMMARY OF THE INVENTION

The present invention overcomes many of the disadvantages and limitations of previous methods and systems of measuring carbon actitvity in a liquid sodium system by resorting to the use of an electrochemical device capable of producing an EMF which indicates directly and accurately the chemical activity of carbon which is related to and thereby indicates the amount of carbon present in solution and available for carburization.

In accordance with a preferred embodiment of this invention, a thin-walled sensing element or carbon permeable membrane of suitable material such as iron containing a suitable electrolyte is immersed in the sodium. After the element comes to equilibrium with the liquid sodium, the chemical activity of carbon in the sodium is equal to the chemical activity of carbon in the iron membrane, that is, (1) $$a_c (Na) = a_c (Fe)$$

The chemical activity of carbon in the iron, which acts as a membrane, is measured by means of the electrochemical concentration cells in which EMF E is given by the expression (2) $$E = \frac{RT}{nf} \ln \frac{a_c (R)}{a_c (Fe)}$$

where

R is the gas constant;
T is the absolute temperature;
n is the number of electrons involved in the electrode reactions (this value is determined by the chemical system used and is 4 for the carbonate system to be described below which is a preferred system);
f is the Faraday constant;
$a_c$ (R) is the chemical activity of carbon at the reference electrode immersed in the electrolyte; and
$a_c$ (Fe) is the chemical activity of the carbon in the iron membrane.

Relationship 2 concerning an alloy type concentration cell is a well known relationship in the art and can be found in "Physical Chemistry of Metals" by L. S. Darken and R. W. Gurry, McGraw-Hill, 1953.

It is thus a principal object of this invention to provide a direct way of measuring continuously the activity and solubility of carbon in an alkali liquid metal system such as sodium.

Other objects and advantages of this invention will hereinafter become obvious from the following description of a preferred embodiment of this invention.

DESCRIPTION OF THE PREFERRED EMBODIMENT

Figure 1:
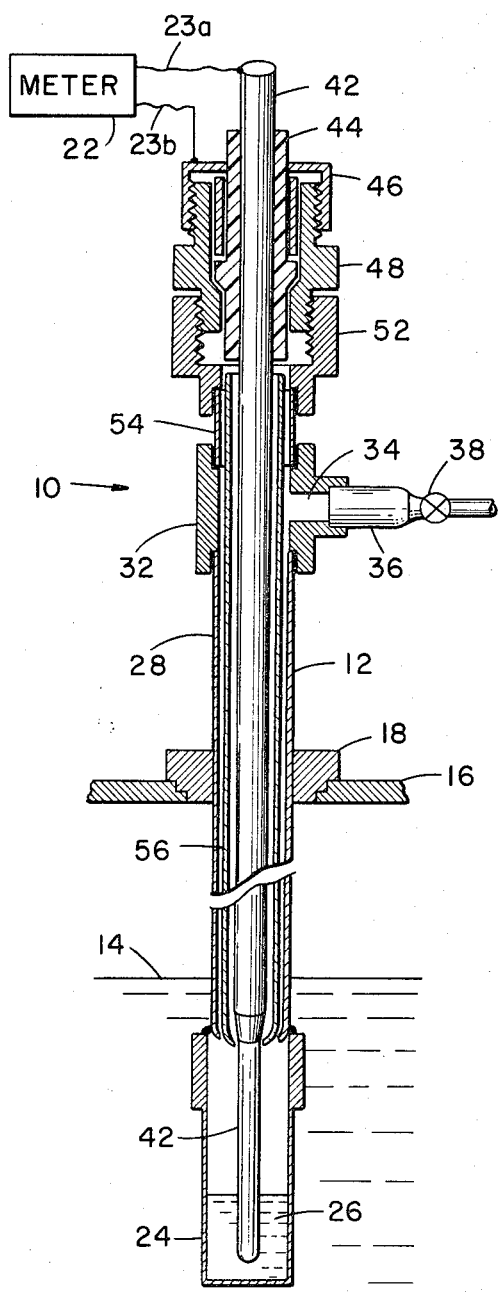
FIG. 1 is an elevation view in section of a preferred embodiment of the invention.

Referring to FIG. 1, carbon meter 10 consists of a probe assembly 12 immersed in a pool of molten alkali metal 14 through containment wall 16 by way of a fitting 18, and an instrument or meter 22 for indicating and recording the voltage (i.e., EMF) developed by probe 12. Meter 22 is connected electrically by leads 23a and 23b to probe 12 in a way to be described.

Probe 12 consists of a thin-walled cup 24 which may be cylindrical as illustrated for containing a suitable electrolyte 26. The thin wall of cup 24 acts as a membrane as will be fully explained later. The thin wall of the cup 24 acts as a diffusion membrane for the carbon present in the liquid metal and any material compatible with the liquid metal being permeable to the carbon is satisfactory. Typical useful metals are iron, nickel, cobalt, and molybdenum for use at higher temperatures.

Cup 24 is supported by an outer tube 28 which may be welded adjacent to the bottom thereof to seal the open end of cup 24 and is also integral with, preferably by welding, fitting 18. The upper end of tube 28 terminates in a fitting 32 having a passageway 34 to accommodate a connection 36 having a bellows seal valve 38 for connection to a source of an inert cover gas for electrolyte 26 within cup 24. The cover gas would be the same as that for use above molten metal 14 within containment wall 16.

Extending down through probe 12 is a reference electrode 42, the bottom end of which is immersed in electrode 26 and the top end of which extends out for being electrically connected to meter 22 by way of lead 23a to complete one side of the circuit. Electrode 42 can be made from any material having a fixed chemical activity of carbon and compatible with the electrolyte being used. Suitable materials for electrode 42 are carburized iron, graphite, or a mixture of a metal and the metal carbide. Electrode 42 is supported adjacent its upper end by a suitable seal 44 which functions also as electrical insulation and gas seal. Suitable material for seal 44 would be a ceramic such as alumina brazed to a metal. Seal 44 is supported by threaded fittings 46, 48 and 52 of electrically conducting material such as iron or stainless steel. Ftting 52 is made integral with a cylindrical sleeve 54 which at its lower end is similarly connected to fitting 32. Tube 28, fitting 32, and sleeve 54 are also made of electrically conductive material such as iron or stainless steel.

Surrounding and spaced from electrode 42 as well as surrounded by and spaced from outer tube 28 is a tubular element 56 which is an electrical insulator to prevent shorting. A suitable material for tubular element 56 is a ceramic such as mentioned above.

It will be seen that the electrical circuit from electrode 42 through electrolyte 26 is by way of cup 24, tube 28, fitting 32, sleeve 54, fittings 52, 48, and 46, and back to meter 22, by way of lead 23b.

In a preferred embodiment of this invention it has been found that for use with sodium as the alkali metal a suitable material for electrolyte 26 is the eutectic mixture of $Na_2CO_3$-$Li_2CO_3$. The eutectic was used in the preferred embodiment because the melting temperature is at about 505° C., well below the range of operation. Any proportions of the ingredients will function, however, as long as the alloy is liquid at the operating temperature. For this system the value of $n$ in Formula 2 is 4 and determined by the valence state of carbon in the electrolyte. With the particular electrolyte described the operating temperature range for carbon meter 10 is found to be 600° to 675° C. The lower end of the temperature range is limited by diffusion of carbon in the iron membrane and the high end of the range is limited by the chemistry of the electrolyte system. However, the range does encompass the normal operating temperature of a liquid metal reactor cooling system employing sodium.

In the operation of carbon meter 10, probe 12 is permanently installed while meter 22 produces an EMF trace in the millivolt range which indicates directly at any time and in absolute terms the value of the chemical activity of carbon present in the sodium surrounding cup 24. After installation of probe 12 is made, however, a period of time is required before carbon present in the sodium thoroughly diffuses through the wall of cup 24 and the system comes into equilibrium.

Figure 2:
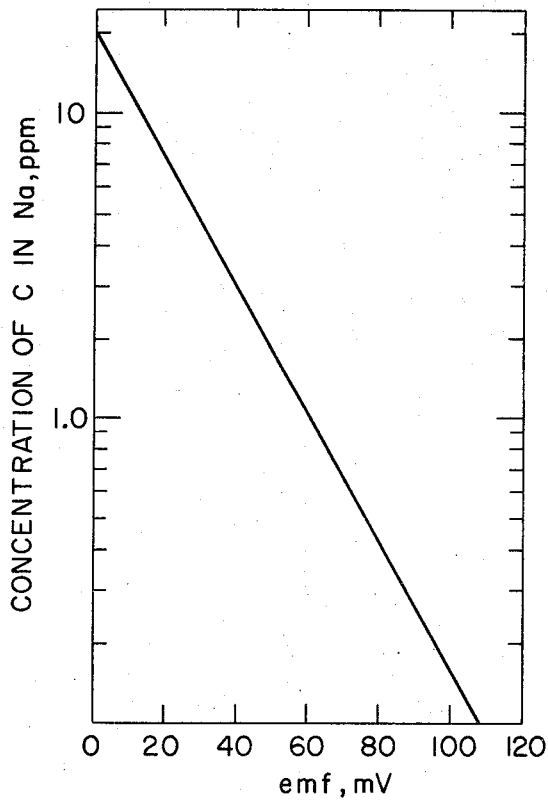
FIG. 2 is a typical calibration curve for an instrument embodying the principles of this invention.

For an example of the type of relationship established between EMF and carbon concentration, reference is made to FIG. 2, showing a typical calibration curve. This curve is for a system based upon the measurement of the solubility of carbon in sodium contained in a nickel vessel. Carbon was added as $Fe_3C$ (carburized iron) while oxygen concentration was less than 1 p.p.m. Membrane wall thickness was 0.005" with a graphite reference electrode. The electrolyte was the $Na_2CO_3$-$Li_2CO_3$ eutectic and operating temperature was 650° C.

Figure 3:
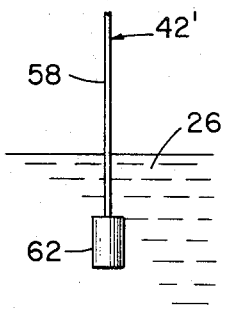
FIG. 3 illustrates an alternative electrode construction.

It will be noted that in the embodiment of FIG. 1 reference electrode 42 provides a heat leak out of cup 24 so that a temperature gradient is present from the wall of cup 24 to electrode 42 through electrode 26, which could cause some mass transfer of iron forming growth of iron whiskers on electrode 42. Referring to FIG. 3, this effect is eliminated (or minimized) in an arrangement consisting of an iron wire 58 having a small cross section (1/32") having suspended at the bottom thereof an enlarged member which may be a cylindrical section 62 of carbon to function as the electrode. Wire 58 can be any metal inert under the conditions of use.

While a preferred embodiment of this invention has been described it is understood that certain other variations are possible. For example, the system can be used with other alkali metals such as potassium, cesium, and rubidium, and instead of using the carbonate electrolyte, a carbide system employing a mixture of $CaC_2$-$LiCl$ has been found to operate successfully with sodium.

It is thus seen that there has been provided a way of measuring with heretofore unattainable accuracy and reliability the chemical activity of carbon and the concentration of carbon present in liquid sodium during the course of operating conditions.

What is claimed is:
1. An electrolytic cell for immersion in molten sodium for generating an EMF indicative of the magnitude of the chemical activity of carbon within said sodium comprising:
   (a) container means having an outer wall suitable for extending into and contacting said sodium along the outer surface of said wall, said wall being of material permeable to carbon within said sodium;
   (b) an electrolyte contained within said container means contacting the inner surface of said wall consisting of a molten mixture selected from the group consisting of $Na_2CO_3$-$Li_2CO_3$ and $CaC_2$-$LiCl$;
   (c) electrode means extending into said electrolyte spaced from the inner surface of said wall comprising a solid material having a fixed chemical activity of carbon; and
   (d) means for measuring the EMF across said wall and said electrode means indicating directly the magnitude of the chemical activity of carbon in said molten sodium.
2. The cell of claim 1 in which the material of the electrode means is selected from the group consisting of carburized iron, graphite, and a mixture of a metal and the metal carbide.
3. The cell of claim 1 in which the wall of said container is made from material selected from the group consisting of iron, nickel, cobalt, and molybdenum.
4. The cell of claim 1 in which said electrode means consists of a metallic wire extending into said electrolyte and supporting completely within said electrolyte a cylindrical member of the electrode material for functioning as an electrode in said cell.

References Cited

UNITED STATES PATENTS

| | | | |
|---|---|---|---|
| 3,523,066 | 8/1970 | Morris et al. | 204—1 T |
| 3,565,769 | 2/1971 | Holden et al. | 204—1 T |

GERALD L. KAPLAN, Primary Examiner

U.S. Cl. X.R.

204—1 T, 195 P